US006999943B1

(12) United States Patent
Johnson et al.

(10) Patent No.: US 6,999,943 B1
(45) Date of Patent: Feb. 14, 2006

(54) ROUTING METHODS AND SYSTEMS FOR INCREASING PAYMENT TRANSACTION VOLUME AND PROFITABILITY

(75) Inventors: Lance Johnson, San Mateo, CA (US); Brian Buckley, Belmont, CA (US); Paul C. Kocher, San Francisco, CA (US); Peter Meffert, Hillsborough, CA (US)

(73) Assignee: DoubleCredit.com, Inc., San Francisco, CA (US)

( * ) Notice: Subject to any disclaimer, the term of this patent is extended or adjusted under 35 U.S.C. 154(b) by 0 days.

(21) Appl. No.: 09/523,405

(22) Filed: Mar. 10, 2000

(51) Int. Cl.
*G06F 17/60* (2006.01)

(52) U.S. Cl. .............................. 705/39; 705/35; 705/37; 705/38

(58) Field of Classification Search .................. 705/37, 705/38, 39, 35
See application file for complete search history.

(56) References Cited

U.S. PATENT DOCUMENTS

| | | |
|---|---|---|
| 4,326,259 A | 4/1982 | Cooper et al. |
| 4,346,442 A | 8/1982 | Musmanno |
| 4,376,978 A | 3/1983 | Musmanno |
| 4,562,341 A | 12/1985 | Ohame et al. |
| 4,597,046 A | 6/1986 | Musmanno et al. |
| 4,718,009 A | 1/1988 | Cuervo |
| 4,734,564 A | 3/1988 | Boston et al. |
| 4,736,294 A | 4/1988 | Gill et al. |
| 4,760,604 A | 7/1988 | Cooper et al. |
| 4,774,663 A | 9/1988 | Musmanno et al. |
| 4,774,664 A | 9/1988 | Campbell et al. |
| 4,812,628 A | 3/1989 | Boston et al. |
| 4,868,866 A | 9/1989 | Williams, Jr. |
| 4,914,587 A | 4/1990 | Clouse |
| 4,953,085 A | 8/1990 | Atkins |
| 4,989,141 A | 1/1991 | Lyons et al. |
| 5,025,138 A | 6/1991 | Cuervo |
| 5,038,284 A | 8/1991 | Kramer |
| 5,161,103 A | 11/1992 | Kosaka et al. |
| 5,177,342 A | 1/1993 | Adams |
| 5,210,687 A | 5/1993 | Wolfberg et al. |
| 5,231,570 A | 7/1993 | Lee |

(Continued)

FOREIGN PATENT DOCUMENTS

CA     2086269     6/1994

(Continued)

OTHER PUBLICATIONS

"Vertrauen auf Gengenseitigkeit", IBM Nachrishten 37, 1987 Heft 291, pp. 46-49.

(Continued)

*Primary Examiner*—Jagdish N Patel
(74) *Attorney, Agent, or Firm*—Sonnenschein Nath & Rosenthal LLP

(57) ABSTRACT

Customers often have access to multiple payment methods for any given transaction. In one embodiment of the invention, a merchant obtains information regarding multiple payment methods from a customer, and sends said information to a transaction evaluator. Via computer networks, the transaction evaluator sends information about the transaction to the issuers of one or more of the payment methods. The issuers perform a cost/benefit analysis of the transactions and respond with a description of the terms under which they are willing to process the transaction. Based on the issuer response, the transaction evaluator selects one of the payment methods. By enabling participating issuers to select favorable transactions and avoid unprofitable ones, the invention can thus improve issuer profitability by directing profitable transactions to participating issuers while directing unprofitable transactions away from participating issuers or to alternate transaction methods that are more profitable or less costly.

46 Claims, 4 Drawing Sheets

U.S. PATENT DOCUMENTS

| | | | |
|---|---|---|---|
| 5,239,462 | A | 8/1993 | Jones et al. |
| 5,262,941 | A | 11/1993 | Saladin et al. |
| 5,274,547 | A | 12/1993 | Zoffel et al. |
| 5,323,315 | A | 6/1994 | Highbloom |
| 5,325,298 | A | 6/1994 | Gallant |
| 5,361,201 | A | 11/1994 | Jost et al. |
| 5,398,300 | A | 3/1995 | Levey |
| 5,444,819 | A | 8/1995 | Negishi |
| 5,479,573 | A | 12/1995 | Keeler et al. |
| 5,630,127 | A | 5/1997 | Moore et al. |
| 5,649,116 | A | 7/1997 | McCoy et al. |
| 5,679,938 | A | 10/1997 | Templeton et al. |
| 5,679,940 | A | 10/1997 | Templeton et al. |
| 5,717,923 | A | 2/1998 | Dedrick |
| 5,719,918 | A | 2/1998 | Serbetciouglu et al. |
| 5,732,400 | A | 3/1998 | Mandler et al. |
| 5,797,133 | A | 8/1998 | Jones et al. |
| 5,815,657 | A | 9/1998 | Williams et al. ............ 395/186 |
| 5,819,226 | A | 10/1998 | Gopinathan et al. |
| 5,845,267 | A * | 12/1998 | Ronen .......................... 705/40 |
| 5,893,080 | A | 4/1999 | McGurl et al. ................ 705/40 |
| 5,950,174 | A | 9/1999 | Brendzel ...................... 705/34 |
| 6,016,484 | A * | 1/2000 | Williams ...................... 705/39 |
| 6,061,665 | A * | 5/2000 | Bahreman ..................... 705/40 |
| 6,119,103 | A * | 9/2000 | Basch ........................... 705/38 |
| 6,243,450 | B1 * | 6/2001 | Jansen et al. ........... 379/144.01 |

FOREIGN PATENT DOCUMENTS

| | | |
|---|---|---|
| DE | 5257200 | 11/1972 |
| EP | 0 440515 A1 | 8/1991 |
| EP | 0 468229 A2 | 5/1992 |
| EP | 0 468229 A3 | 5/1992 |
| EP | 0 709811 A2 | 5/1996 |
| WO | 92/04679 | 3/1992 |
| WO | 94/06103 | 3/1994 |
| WO | 94/60103 | 3/1994 |
| WO | 94/20912 | 9/1994 |
| WO | 96/30850 | 10/1996 |
| WO | 97/00483 | 1/1997 |

OTHER PUBLICATIONS

Cooper et al., "Adaptive Pattern Recognition: Neutral Networks in Real World Applications", Jun. 18, 1989, Tutorial IEEE/INNS International Joint conference on Neutral Networks.

Robert Hecht-Nielsen, "Theory of the Backpropagation Neural Network", Department of Electrical and Computer Engineering, University of California at San Diego, La Jolla, CA.

Gullo, "Neural Nets Versus Card Fraud, Chase's Software Learns to Detect Potential Crime", Feb. 2, 1990, American Banker.

Caudill et al., "Neural Network Applications", 1990 Naturally Intelligent Systems, A Bradford Book, The MIT Press.

EPO, International Search Report, Sep. 22, 1998, PCT/US98/10740.

McClure, "Taking the Risk Out of Transactions", Mar. 1994, USA, Security Management vol. suppl. issue, pp. 23A-24A, XP-002076870, ISSN 0145-9406.

Visa International service Tarot Preliminary Business Case, pp. 2-27, Nov. 28, 1994.

Associate Credit Bureaus, Inc., Metro Format for Consumer Credit Report, pp. 1-69, Jan. 1, 1994.

L. Purcell, "Roping in Risk, May 1994", Bank System Technology, pp. 64-68.

Quinn, "Credit Card Issuers Keepinng Closer Watch on How you Pay Bills", Apr. 25, 1988, Washington Post, Business Section, p. 67.

"Credit Risk Management Report", v. 3, No. 19, Philips Business Information, Inc., dialog file 636, Accession No. 02020764, Sep. 17, 1993.

Chandler, "Credit Scoring", Credit Union Executive, Dialog file 648, Jul. 1985.

Grafton, "Analyzing Customers with Behavioral Modeling", 1996, Credit Control, v 17n6, pp. 27-31, dialog file 15, Accession No. 01265295.

Leonard et al., "Automating the credit decision process", Journal of Retail Banking, v. 16, n. 1, p. 39(6), Spring 1994, Dialog file 148, Accession No. 07816398.

Thomas J. Healy, "The new Science of Borrower Behaviour", Mortage Banking, v. 58, n. 5, p 26(8), Feb. 1998, dialog file 148, Accession No. 10389009.

Scott D. Aquais, "It's the economy, issuer!", Credit Card Management, V5n11, pp: 58-60, Feb. 1993, dialog file 15, Accession No. 00681693.

Kevin T. Higgins, "Retention by the numbers", Credit Card Management, v5n11, pp: 52-56, Feb. 1993, dialog file 15, Accession No. 00681692.

* cited by examiner

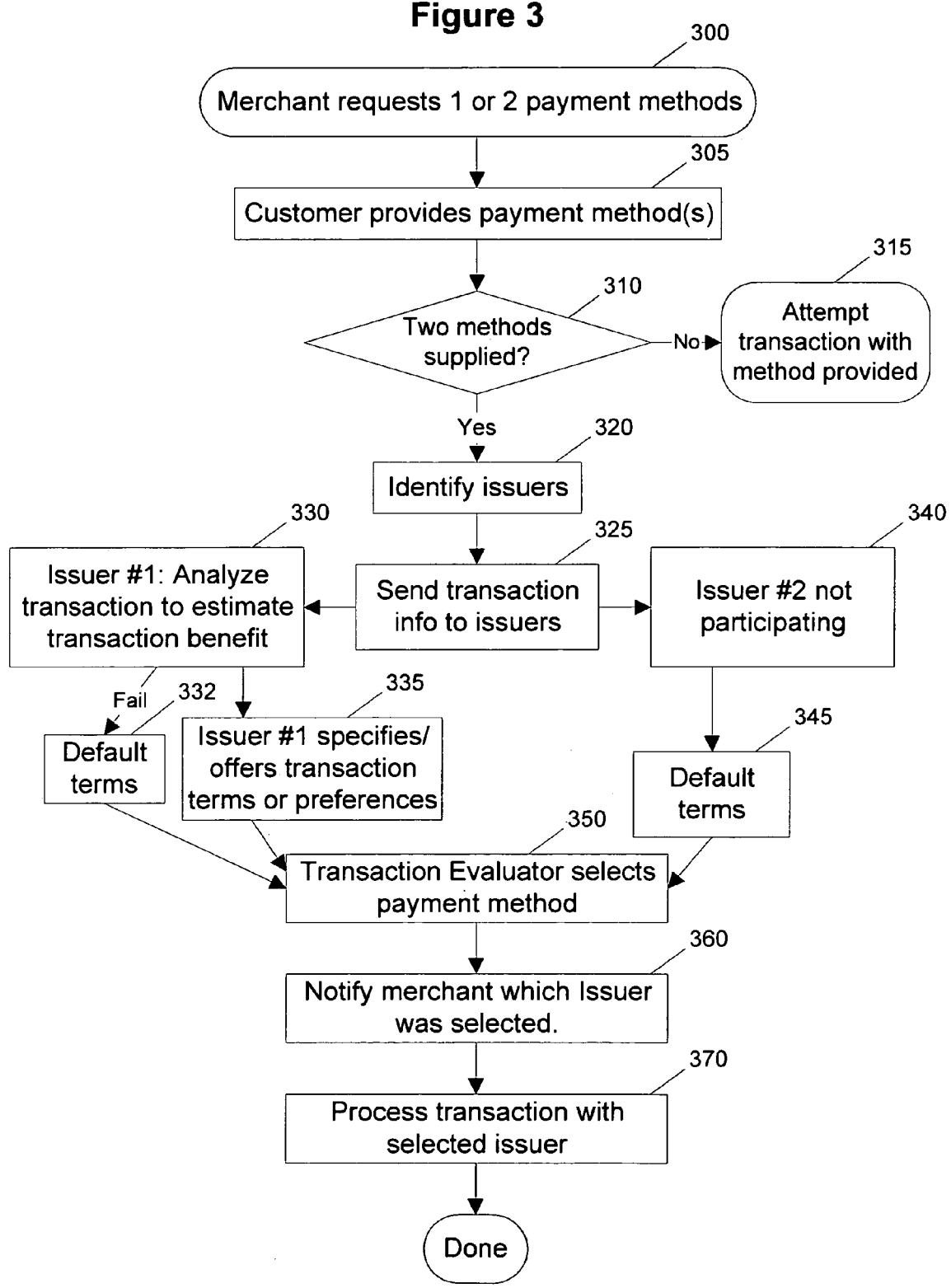

ROUTING METHODS AND SYSTEMS FOR INCREASING PAYMENT TRANSACTION VOLUME AND PROFITABILITY

FIELD OF THE INVENTION

The invention relates to methods and apparatus for the automated processing payment transactions.

BACKGROUND OF THE INVENTION

Introduction

Electronic payment processing systems play a critical role in modern economies by providing merchants and customers with efficient methods for conducting transactions. Leading customer-to-business payment systems include cash, credit cards, debit/ATM cards, and checks. Banks and companies that offer payment instruments (issuers) can derive revenue from interest, fees, and penalties charged to customers and merchants. In general, credit cards and other payment methods with higher fees or customer interest rates are the most profitable for issuers.

Banks issuing credit cards and other payment instruments can increase revenue by either increasing the number of income earning accounts or by increasing the income per existing account.

The traditional methods for adding new accounts include but are not limited to direct customer solicitations and portfolio acquisition. Both methods are costly, entail a level of risk associated with the unknown and considering the initial investment necessary, have limited capability in the short term to impact net profitability. Additionally the long-term success of either depends on the issuer's ongoing ability to manage these new accounts in a profitable manner.

Methods used for income enhancement for existing accounts include additional or increased account management fees for new or existing services, penalty fees for improper account or instrument usage and interest rate manipulation. Although these methods can be effective, the acquisition process is highly competitive and fee increases may cause a loss of customer loyalty thereby reducing the instruments use and potentially loss of the customer account, both of which impact long term portfolio profitability. Additionally, if fees and interest rates appear to be excessive, regulators and card associations may intercede on behalf of consumers, and cap these charges.

An alternative or complementary way to increase revenue is to increase transaction volume on current credit card accounts. As a result, competing issuers are increasingly seeking ways to increase the use of, and loyalty to, their cards. Reward programs are one commonly used method for encouraging customers to use a particular issuer's cards. Examples of reward programs include frequent flier miles offered by some credit cards, the cash rebate offered by the Discover card, and the reward programs described in U.S. Pat. No. 5,025,372 to Burton et al., in U.S. Pat. No. 6,018,718 to Walker et al., and in U.S. Pat. No. 6,009,412 to Storey. Although reward programs can attract customers and increase transaction volume, they are costly and relatively inefficient. As a result, issuers will provide rewards for some unprofitable transactions, fail to attract some transactions that would be profitable, and may cause some marginal accounts to default by encouraging over-use of credit.

Methods for applying merchant incentives (and other transaction modifiers) at the point of sale are also known, but these are generally used by merchants to encourage customer purchases. For example, U.S. Pat. No. 5,945,653 to Walker et al. describes a variety of methods whereby a merchant and a credit card issuer can implement systems to allow transaction-specific discounts. The Prio service operated by Infospace.com also allows merchants to provide discounts to customers. The cost of such discounts would generally need to be borne by the merchant. The issuer has little incentive to contribute to the incentive because the issuer derives relatively little benefit by discounting transactions that would occur anyway. (The possibility of increased transaction volume is not worth enough to justify a significant issuer-funded incentive.) Furthermore, establishing and maintaining the system such as the one described in '653 would be extremely expensive and complex, particularly if each merchant must negotiate and manage a separate relationship with each issuer and/or customer.

Payment Systems

A variety of payment mechanisms are currently in widespread use. Conventional cash is straightforward, but both inconvenient for most transactions and is irreplaceable if lost, stolen, or destroyed. Impulse purchases cannot be made using cash unless the customer happens to be carrying enough money to cover the cost of the transaction. Cash can also be counterfeited, either causing the accepting party to lose the transaction amount or devaluing the currency as a whole. Because transporting cash is risky and slow, it is difficult to use for Internet or mail-order purchases without relying on (expensive) cash-on-delivery options offered by some package delivery services. Although the costs associated with handling cash are relatively low, they are non-negligible due to the risks described above.

For customers, checks have several advantages over cash because they are non-negotiable before they are signed. (In most cases, the account holder is not liable if the signature on a check is forged.) In addition, they can be used for impulse purchases of any amount, provided that the customer has sufficient finds to cover the purchase. Fees for clearing checks are generally low, but merchants usually bear the loss if a check is disputed prior to account clearing, e.g., if the funds in the customer's account are insufficient to cover the payment. As a result, checks are generally not accepted for high-risk transactions. Compared to electronic transactions, checks are slow to mail and clear, making them awkward for mail-order and Internet purchases.

Techniques for improving check-based transactions include check guarantee cards so that merchants can verify the validity of a check at the point of sale, electronic check clearing networks (such as NACHA), account or customer activity or black lists (such as Telecredit) and electronic methods for allowing check payments without exchange of a paper check. Use of paper instruments is incompatible with the non-face-to-face transaction as exemplified by mail or telephone order and Internet based transactions. Although potentially important, the implementation of electronic check substitutions is not yet widespread, and the historical fear of account misuse may pose a significant obstacle to customer acceptance.

Credit cards and many other kinds of payment cards have several important benefits over checks. With credit card transactions where the card is present at the point of sale and the payment is authorized by the issuer, the merchant is usually guaranteed to be paid—even if the card is invalid or stolen or if the customer fails to pay his/her account balance. (The major exception is that the merchant is usually held completely liable for the transaction if there is no signature on the draft or a PIN was not used tQ consummate the payment.) Credit card numbers can be exchanged over the telephone, allowing almost instantaneous mail-order and Internet transactions. Credit card users are generally extended a credit line, allowing impulse purchases that exceed their available cash while providing issuers with a source of revenue from interest charged on outstanding balances. Merchants accepting credit cards are charged a relatively high discount rate (typically between 1.6 and 4 percent), making credit cards more expensive to process than most other payment methods. This discount rate includes fees charged by the acquirer as well as the "interchange fee" which is predominately paid to the issuer.

FIGS. 1a and 1b diagram a typical credit card transaction. The authorization process occurs first and is shown in FIG. 1a. The customer (100) provides the card or card number to a merchant (110), who submits a summary of the transaction as a request for authorization to an acquirer (120). The acquirer (120) submits the summary to the appropriate credit card payment network (130), which in turn either decides on the card issuer's behalf or submits the transaction to the issuer (140) for a decision. Possible decisions can include "approve", "decline" (with or without special conditions such as confiscating the card), or "refer" (meaning that the merchant must contact the card issuer or its agent for some reason, e.g. for additional cardholder verification steps or to inform the merchant of special processing requirements). If the card association authorizes on behalf of the issuer then the decision is routed back to the merchant and also to the issuer. If the issuer decides on their own behalf then the decision is routed back through the network to the merchant.

If the transaction decision was to approve the transaction, then the transaction can be processed as shown in FIG. 1b. The merchant (110) completes the sale and submits the complete transaction to the acquirer (120). The acquirer (120) in turn submits the transaction to the credit card payment network (130), which in turn forwards the transaction to the issuer (140) who then posts the activity to the cardholder's account. In some networks, authorization and transaction processing are performed simultaneously using single set of messages.

The reimbursement process typically works in reverse, where the issuer (140) pays the payment network (130) the transaction amount less its portion of the interchange fee (which in most cases is all of the interchange fee). The payment network (130) pays the acquirer (120) the transaction amount minus the interchange fee and any transaction fees it imposes. Finally, the acquirer pays the merchant (110) or the merchant bank the transaction amount minus the merchant's discount (the discount encompassing each of the previously stated fees plus any additional fees added by the acquirer). Payments to participants can be "netted" to reduce the amount of money transferred in the system. For transactions involving multiple currencies, currency conversions can be applied by the card association or other participants.

Several methods for reducing costs for one or more of the participants in the payment transaction are known. Large merchants can negotiate reduced fees with acquiring banks, although the largest component of the discount rate—the interchange fee—is fixed by the credit card network and is therefore non-negotiable. It is also known that issuers can refund a portion of the merchant's discount rate or other fees so that merchants can offer discounts to customers who use the issuer's payment products. It is also known for merchants to offer discounts or refunds to customers who enroll for new payment methods, such as the merchant's own credit card or a co-branded credit card. Card-present transactions involve lower interchange fees, so merchants can try to ensure that the credit card is swiped with each transaction.

Discount Schemes

Although most credit card association rules require identical prices for cash and credit card transactions, some merchants offer discounts to customers for cash and other payment methods. Alternatively, some merchants impose surcharges on customers for paying with credit cards.

Some payment cards include support for multiple payment networks. For example, a typical credit card or debit card might support a major credit brand (e.g., MasterCard) as well as one or more alternate networks (e.g., Cirrus, Star, Interlink, Plus, etc.). Merchants (such as grocery stores) may not support the major brand (e.g., because the discount rate is too high), but may be able to process transactions on lower-cost networks.

U.S. Pat. No. 6,014,635 to Harris et al. describes a credit card transaction discounting system that leverages existing credit card networks' authorization and transaction processing capabilities. The operator of the scheme issues identification numbers to customers, where the identification numbers comply with credit card number formatting standards and begin with a bank identification number (BIN) that can be processed through standard credit card networks. The customer's identification number is linked to a credit card belonging to the customer. When transactions are attempted on accounts with this BIN, the discount system uses the customer's account number to locate the customer's credit card number and performs a debit against that account. In addition, the system posts a credit to the customer for the discount (refund) amount. This approach has several serious limitations. First, there is no clear business model to fund the discounts, since the transaction processing cost includes both the cost of processing the transaction through the credit card network plus the cost of the refund. Also, credit card association rules may prohibit the use of "dummy" card numbers. In addition, although card issuers are responsible for fraud on card-present transactions, transactions using the discount scheme may be treated as card-not-present, leaving either the discount scheme operator or the merchant with higher fees and exposure to risks normally borne by the issuer.

In another known scheme, transactions using a particular payment instrument can be processed using any of several networks. For example, some cards issued for use on ATM networks support transactions processed via a variety of payment networks, such as Star, Plus, Cirrus, etc. Regardless of which network is chosen, the same ATM card is used and the same account (funding source) from the same issuer is debited. Multi-network ATMs use priority lists that rank the supported networks so that transactions will be processed using the most-favored (e.g., lowest-cost) compatible network.

Risk Analysis Systems

Risk analysis systems are used by issuers and other participants in payment systems to evaluate the risk associated with a transaction given knowledge about the account and transaction.

Transaction risk evaluation involves two levels. The first involves "underwriting characteristics," which are indicative of risk and "goodness" as determined by cardholder information (either for the cardholder as indicated by a credit or fraud reporting agency) or the account (as indicated by the type, current condition, historical evidence and unique characteristics associated with its use). The second group of characteristics is those associated with the transaction, such as merchant information and purchase characteristics. Most risk management systems place a higher dependence on the cardholder and account information, since the issuer is often able to see only simple characteristics of the transaction. (At the point of authorizing a credit card transaction, the issuer usually does not know who the merchant is, may not know the merchant's type, and almost never knows what is being purchased.)

The evolution of automated risk control systems has gone through multiple stages. Early systems did little more than determine whether the account actually existed and if there was sufficient funding available to the cardholder.

More advanced systems were developed to analyze velocity characteristics (such number of transactions in a given period of time), transaction sizes, and whether transactions are for cash (or quasi-cash like money orders) as opposed to "regular" purchases. These filters were then combined with the cardholder characterization to produce static, numeric "scores" assigned to accounts and transactions.

Although these static scores are still the predominant method used in the most situations, more sophisticated scoring methods using expert systems and neural networks are also known. With neural networks, the scoring of transactions and accounts over a multivariate environment is possible. Although such scoring is generally not done in real-time, the scores are updated frequently with weighting changing with each analysis. Historically these systems were used to identify only the risk of a transaction. Recently a few issuers have begun experimenting with the converse, the value of a transaction. Still other issuers generate two measures. The first is the traditional risk indicator, but the second indicates potential value. A composite of this information is then used to determine if a requested transaction should be authorized. A built in impediment has limited the value of these new systems, however: once transaction is entered into the authorization networks, the issuer must provide a binary "yes" or "no" answer. Furthermore, card association rules and certain legal restrictions may prevent the issuer from rejecting transactions if the account is in good standing and there are funds available. As a result, methods for assessing the value of individual transactions cannot be completely utilized in many payment networks because high risk transaction must be accepted if the issuer has no specific evidence that the transaction is bad (such as a bad PIN).

Conclusion

Revenues and profits for issuers, acquirers, and electronic payment networks are often highly dependent on transaction volume. For issuers, methods of the background art (such as advertising to attract new customers and customer incentives to add transactions) are expensive, slow, and have unpredictable effectiveness. The invention introduces novel methods and apparatuses for increasing and/or controlling transaction flow, which may result in improved issuer profitability and/or decreased merchant costs.

Glossary

The following terms have the meanings indicated with respect to the preferred embodiments described below. However, these meanings are exemplary rather than exhaustive, as other exemplary meanings for these terms will be understood from their plain meaning as commonly used in the field of financial transaction processing.

Acquirer: The term "acquirer" refers to the bank, company, or other organization that has the contractual and funds settlement relationship with merchants. Acquirers, either directly or via their agents, are responsible for processing transactions through to the issuer (e.g., via an electronic payment network) and paying the merchant. Examples of acquirers include, without limitation, credit card acquirers and merchant banks that accept checks. The role of the acquirer may involve several different companies or organizations, such as banks, independent service organizations (ISO's), or processors.

Authorization: The term "authorization" refers to both the process and product of the process by which a merchant requests liability protection or other assurances that a payment instrument is valid before accepting a payment instrument to consummate a sale. In many cases, the assurance includes a guarantee by the payment instrument issuer to accept responsibility for payment of the transaction.

Automatic Teller Machine (ATM): The term "Automatic Teller Machine" (or "ATM") means a cash-dispensing machine. ATMs commonly use a customer's card to identify an account to debit and receive a PIN from the user to verify the cardholder identity before dispensing money.

Cash: Currency issued by a government, or private equivalents.

Chargeback: The term "chargeback" refers to both the process and product of the process that an issuer uses to debit part or all of the value a sales transaction from a merchant based on some violation of rules by the merchant or non-acceptance right exercised by the issuer.

Clearing: The term "clearing" refers to the process of providing accounting details sufficient for the purposes of debiting a cardholder account, and creating net funds positions among issuers, acquirers and merchants.

Computer: A software-controlled electronic data processing device, including without limitation microprocessor-driven circuits, personal computers, mainframe computers, and embedded systems.

Credit Card: A payment card that offers a revolving line of credit.

Debit Card: A payment card that is linked to a funds-bearing account (e.g., a bank checking account) so that purchases are debited from the linked account.

Discount Rate: The difference between the amount of a transaction and the amount paid to the merchant. In the case of credit card transactions, the discount rate includes fees charged by the acquirer plus payment network and interchange fees. For example, a merchant might receive $98.50 from a $100 transaction, corresponding to a discount rate of 1.5 percent.

Electronic payment network: An electronic network that connects issuers and acquirers and enables them to settle transactions. Many electronic payment networks "net" transactions so that each participant pays or receives an amount corresponding to the difference between their total debits and credits through the network for a given time period. Examples of electronic payment networks include VISA, MasterCard, STAR, Carte Bancaire, FedWire, and NACHA.

Issuer: The bank, company, or other organization that issues a payment instrument. The issuer often (but not always) maintains a relationship with the customer, providing account statements and other services. Examples of issuers include without limitation credit card issuers, companies or banks issuing electronic money, banks that provide checking accounts, and governments that issue cash.

Payment Card: Any general purpose payment card (including without limitation smart cards and/or magnetic stripe cards) that can be used by a customer to perform payment transactions. The term payment card shall be understood to include, without limitation, debit cards, cards that offer a revolving line of credit, and cards that do not offer a revolving line of credit. Payment cards can be issued by any organization, including without limitation banks, merchants, savings and loans, card associations, specialty travel and entertainment companies, etc.

Settlement: The funds transfer and disbursement enabled by the clearing record.

SUMMARY

Customers often have access to multiple payment methods for any given transaction. For example, a customer might be able to pay for a purchase using cash, a check, a debit card, or a credit card. Currently the customer choice of payment methods is often arbitrary, since most merchants charge the same prices for all supported payment methods.

For any payment system, issuers process some transactions that are highly profitable and others that are unprofitable. Even in systems that provide issuers with the ability to evaluate and reject individual transactions, many transactions likely to be unprofitable must still be accepted because rejecting a transaction creates new costs and problems such as customer complaints, customer dissatisfaction, merchant dissatisfaction, potential legal issues, etc. As a result, even if a large fraction of transactions are unprofitable, issuers must accept virtually all transactions that enter their systems and must derive enough revenue from the profitable transactions to make their business profitable. For example, credit card transactions from customers who pay their balances each month generally lose money, but a few charges from individuals who carry balances at high interest rates can compensate for a relatively large number of unprofitable transactions.

If issuers had better control over which transactions they processed, their profits would increase significantly. Consider, for example, an issuer's portfolio where 85 of 100 transactions lose $0.75, but 15 of 100 make a profit of $5. Overall, the portfolio makes an average profit of (15)($5)−(85)($0.75)=$11.25 per 100 transactions. Some of this transaction volume is from customers with two payment instruments (e.g., two credit cards or a credit card and a checkbook). If the issuer had more transaction-level control, profitability would be much greater because they would be able to obtain a larger share of profitable transactions and a smaller share of unprofitable transactions.

For example, assume that K is the fraction of customers who are willing to offer two independent payment instruments. For these customers, unprofitable transactions can be sent to the secondary payment method, reducing the number of unprofitable transactions by a factor of (1−K). In contrast, the issuer will be able to process profitable transactions where the issuer's payment instrument was either of the two offered. As a result, the number of profitable transactions increases by a factor of (1+K). In the example above, the total profitability per 100 potential transactions increases from (15)($5)−(85)($0.75)=$11.25 to (15)(1+K)($5)−(85)(1−K)($0.75). For example, if the issuer can influence K=20% of the total transaction pool, the portfolio will generate 68 transactions that lose $0.75 and 18 transactions that each make $5, for a total profit of $39—a 247 percent increase in profit. (Note that only 86 transactions are now performed because a larger number unprofitable transactions were avoided than profitable transactions were added.) Even with K=1%, issuer profits increase 12.3 percent!

The system's benefits do not depend on any particular ratio of profitable to unprofitable transactions. For example, consider a portfolio where 85 of 100 transactions make $0.75 but 15 of 100 lose $3.50. The initial profitability is $11.25 per 100 transactions. With K=20%, the profitability becomes (85)(1+K)($0.75)−(15)(1−K)($3.50)=$34.50 on 114 transactions, a 207 percent increase in total profit.

The invention provides issuers with the ability to select or reject individual transactions prior to the customer committing to any specific payment scheme. A transaction evaluator obtains information about multiple payment methods supported by a customer and then, based on criteria such as profitability to the issuers, uses automated systems to select one of the supported payment methods for the transaction. Thus, the system can improve issuer profitability by directing profitable transactions to participating issuers while directing unprofitable transactions away from participating issuers or to alternate transaction methods that are more profitable or less costly. A portion of this increased profit can be provided back to the merchant or customer in the form of discounts, rebates, or other incentives.

It is therefore an object of one aspect of the invention to provide payment instrument issuers with the ability to increase their control over how many and which transactions they process.

It is also an object of another aspect of the invention to allow issuers to provide incentives to merchants and transaction processors in exchange for an increased number of desirable transactions and/or a reduced number of undesirable transactions.

It is also an object of another aspect of the invention to provide merchants with rebates or discounts in transaction processing fees for transactions processed over conventional payment networks, without forcing every merchant to negotiate discount terms with each issuer.

It is also an object of another aspect of the invention to provide merchants the ability to discretely identify and avoid higher risk transaction opportunities and thereby mitigate certain risk exposure.

It is also an object of another aspect of the invention to provide methods and systems for enabling and incentivizing merchants to obtain and process information about multiple payment instruments supported by their customers.

It is also an object of another aspect of the invention to allow customers access to multiple payment systems providing merchants the opportunity to increase sales to otherwise unavailable consumers.

It is also an object of another aspect of the invention to allow issuers to perform quantitative cost/benefit analysis on a per-transaction basis then use the results to influence payment processing decisions.

It is also an object of another aspect of the invention to provide merchants with access to quantitative cost/benefit analysis on a per-transaction basis and the ability use the results to influence payment processing decisions.

It is also an object of another aspect of the invention to route transactions more efficiently and to provide issuers with additional information about the transactions they process.

Depending on the particular configurations needed for differing operational environments, various embodiments of the invention may combine various subsets (including possibly all) of the above aspects, thereby achieving various subsets of the above objects. However, the invention is not necessarily to be construed to require all of the above aspects or to achieve objects.

BRIEF DESCRIPTION OF THE FIGURES

FIG. 3 illustrates processing steps performed in one embodiment of the invention

DETAILED DESCRIPTION

A. Overview

Figure 1A:
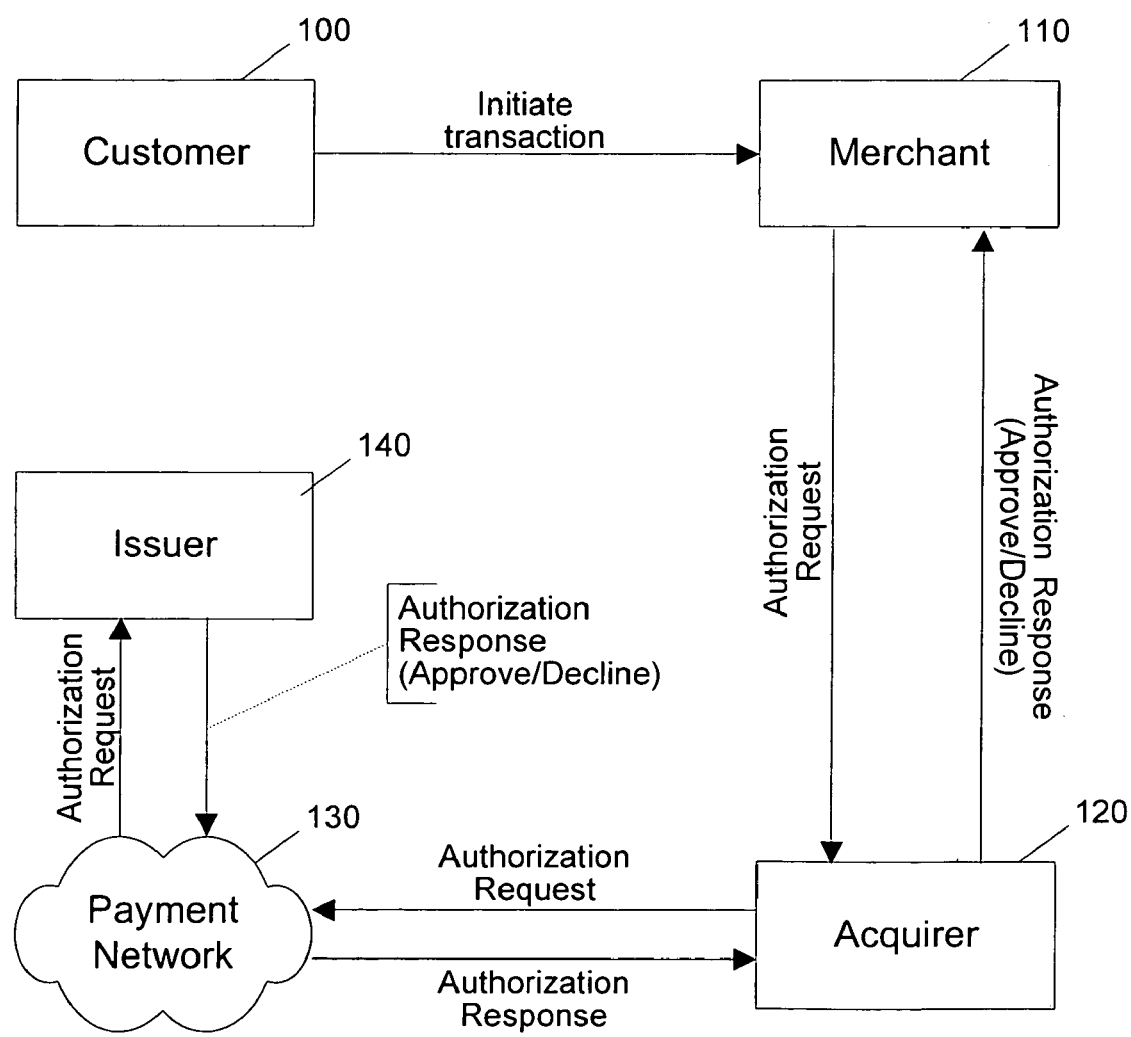
FIG. 1 illustrates steps involved in processing of a credit card transaction of the background art.
Figure 1B:
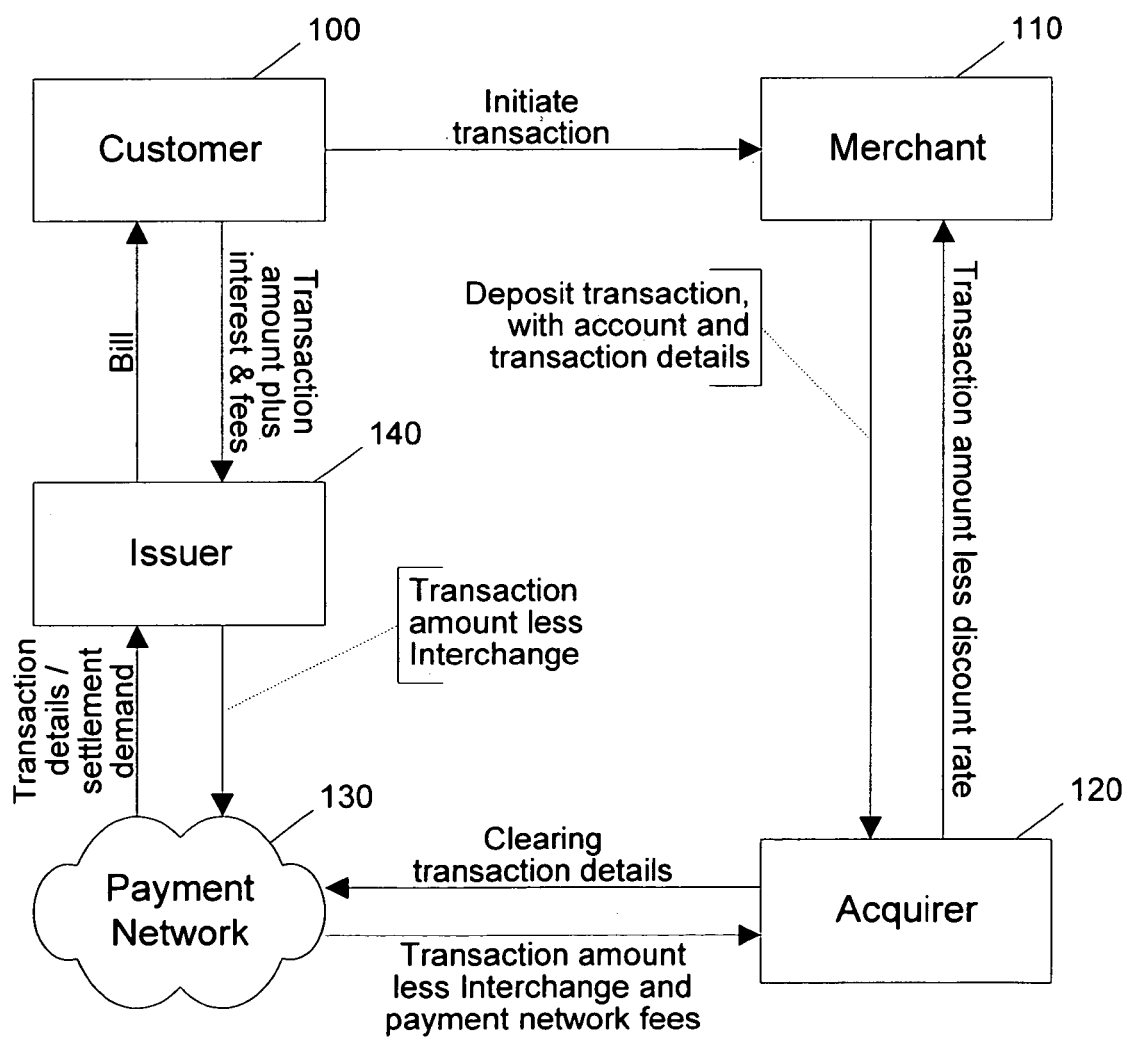
Figure 2:
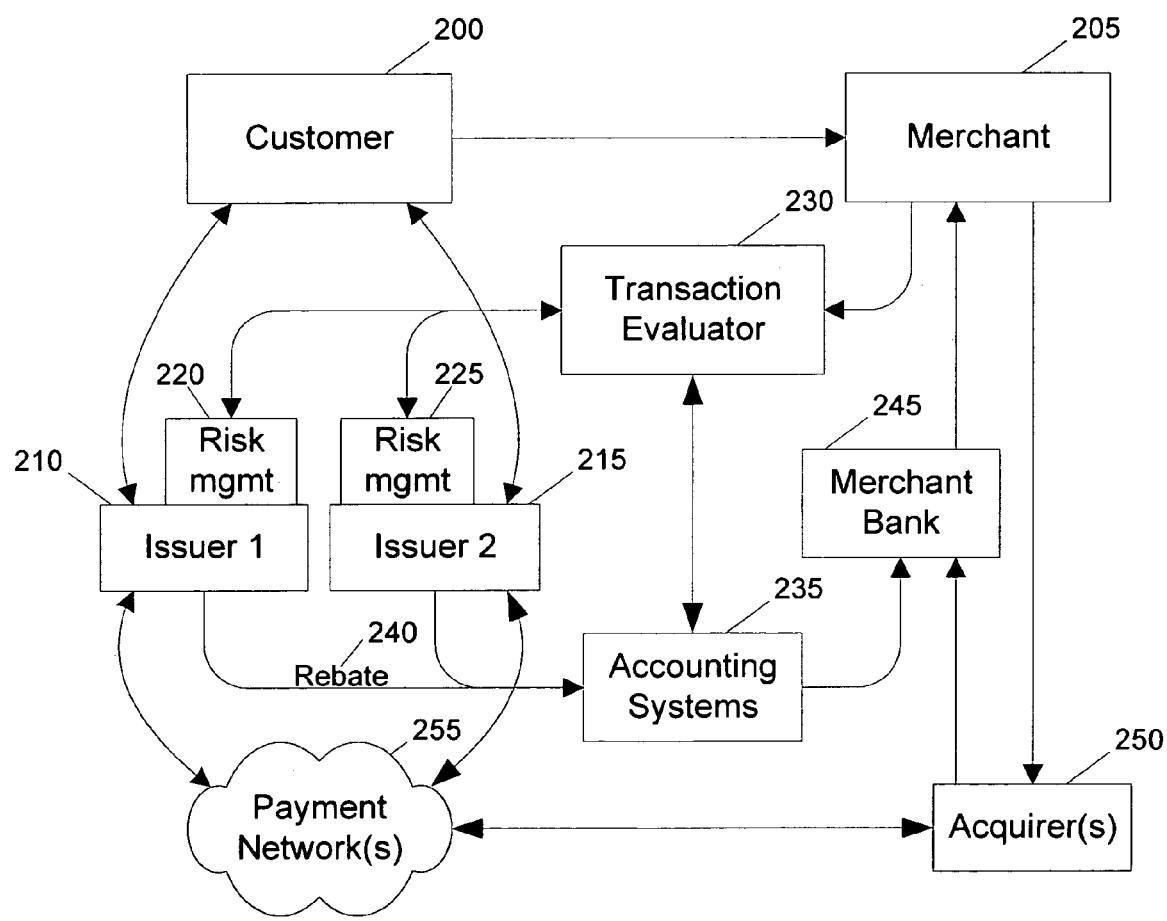
FIG. 2 illustrates several transaction processing components in one embodiment of the invention.

FIG. 2 shows the overall transaction flow in an exemplary transaction using an exemplary embodiment of the invention. Customer (200) has relationships with issuer 1 (210) and issuer 2 (215), issuers of two payment instruments. Each issuer may provide services to the customer, the payment network, and/or any other entity involved with the network, such as providing transaction and billing statements showing purchases, extending credit, and accepting risk if customer (200) fails to pay.

To make a payment to merchant (205), customer (200) provides information describing the payment method(s) that the customer can offer and is willing to allow the merchant to use for the transaction. If the customer can only provide one payment method acceptable to the merchant or that can cover the entire purchase amount, the merchant processes the transaction with that method. Otherwise, the merchant receives information about two or more methods with the understanding from the customer that the transaction may be processed by either or any of these methods.

In exchange for providing the merchant with increased billing flexibility, the merchant can optionally provide an incentive to the customer, such as a price discount, a rebate, free shipping, improved payment terms (such as a reduced interest rate), award points (such as airline frequent flier miles), or additional products or services. The nature and size of the customer incentive can be based on factors including without limitation the types of payment instruments offered, their issuers, transaction characteristics (amount, risk, currency, merchant type or identity, date/time, etc.), transaction processing costs, issuer rebates, etc. Alternatively, the merchant may be able to impose a surcharge if only one payment method is supplied and/or based on the characteristics of the payment methods offered.

Merchant's point-of-sale systems provide information about the transaction methods to transaction evaluator (230) (described in Section E below and elsewhere), which is responsible for selecting one of the payment methods. Both the process of sending information to the transaction evaluator and the transaction evaluator's selection processes are preferably automatic. The selection result typically depends on the estimated cost/benefit characteristics (e.g., economic utility) for each payment method. For example, a payment instrument from an issuer that has a business relationship with the transaction evaluator (which can be operated by the merchant, the issuer, some combination of entities, or independently) to provide a 50-cent rebate per transaction would be chosen over a similar instrument from an issuer that does not. Similarly, a payment method with lower risk or fees (such as cash) could be selected over one with higher fees (such as check). The transaction evaluator can also route transactions that are likely to be unprofitable (e.g., if the transaction is small or has a high credit loss or fraud risk, etc.) away from issuers who have appropriate business relationships with the merchant or the transaction evaluator.

In the embodiment shown in FIG. 2, the transaction evaluator provides information about the transaction to the risk management systems operated by or on behalf of one or more issuers. These systems analyze the transaction characteristics to determine the cost or value of processing the transaction via each payment method. The issuer's risk management systems can be configured to perform a cost/benefit analysis of the transaction to estimate the expected profit or loss associated with handling the transaction. If an issuer does not have any business relationship with the transaction evaluator or lacks real-time transaction evaluation capability, then the cost/benefit analysis for processing that transaction can be performed by the transaction evaluator. Alternatively, for some transactions, the processing terms may be based on predetermined rules that can be applied by the transaction evaluator, the merchant, or any other party. In one embodiment of the invention, participating issuers offer a flat per-transaction rebate or incentive to the transaction evaluator in order to receive transactions. Alternatively, issuers can pay a monthly fee for preferential access to transactions. Alternatively or in addition, issuers can provide incentives to not receive (or receive fewer) transactions that are likely to be unprofitable. In a more advanced embodiment, issuers perform real-time analysis of the transaction data and offer variable-amount rebates (or discounts from transaction processing costs or other incentives) in order to receive profitable transactions or to avoid unprofitable (or otherwise disadvantageous) ones. Methods for analyzing transactions to make routing decisions are described in more detail below with respect to FIG. 3. Issuer incentives can be of any form. For example, in one embodiment, issuers provide incentives (such as free shipping and discounted interest rates) that merchants can pass along to customers. In another embodiment, issuers provide advertising and other non-monetary benefits to merchants.

Based on its analysis, the transaction evaluator chooses one transaction method and notifies merchant (205) which method to use when processing the payment transaction. The merchant notifies the customer which payment method will be used and submits the transaction for payment through the appropriate transaction processing mechanism. In the case of a typical credit card transaction, the merchant electronically submits the transaction (including at least an identifier of the payment method and the amount) to a payment network via an acquirer (250) who makes a deposit in the merchant bank account (245) and may notify the merchant that the transaction was deposited successfully. The acquirer forwards the transaction to the payment network (255), which pays the acquirer. The payment network submits the transaction to the appropriate issuer (210 or 215), which pays the network. Finally, the selected issuer (210 or 215) bills the customer (200) for the transaction amount.

If one or both issuers agreed to pay any rebates (or other incentives) in connection with the chosen processing method, then accounting systems (235) track the rebate/incentive amounts based on the transaction evaluator decision results. For example, the accounting systems can verify that issuers (210 and/or 215) pay the correct rebate amounts (240), ensure that the merchant's share of any rebate amounts are deposited in merchant bank account (245), and keep records so that transactions can be audited.

In most embodiments, the customer is notified at the end of the transaction (e.g., on a receipt, on a web page, via e-mail, by a telephone operator reading from a computer, by a display on a wireless PDA containing a payment wallet, etc.) which payment method was selected. If any customer actions remain that are required to explicitly authorize the payment (e.g., supplying cash or a check, signing a credit card receipt, signing a paper check, providing a digital signature, inserting a smart card, entering a PIN, pressing a confirmation button, providing the last digits of a credit card number, etc.), these steps are preferably (but not necessarily) performed after the selection is complete. (Alternatively, these steps could be performed for one or both methods prior to the final selection, but customer effort associated with the non-selected method would be wasted.) In a preferred embodiment, the transaction evaluator decision is configured to minimize the delay from when the customer first provides the payment methods to when the transaction is completed. For example, the transaction processing can be automated using computer-based processing systems and electronic data networks. In one embodiment of the invention, the Internet is used to carry transaction processing messages.

In environments where communication is unreliable or expensive, any or all of the merchant terminal (205), transaction evaluator (230) and/or the issuer risk management systems (220 and 225) can be combined. The per-transaction cost/benefit analysis can thus be performed by the transaction evaluator, optionally using data records stored in a memory containing payment selection criteria. These records can include without limitation rules, software, algorithms, and/or data describing payment processing terms, preferred payment instrument types, preferred issuers, blacklisted instruments, blacklisted issuers, rules for computing transaction processing terms for preferred issuers, rules for computing default transaction processing terms, network routing tables, processing issuer responses, handling failure modes, determining customer incentives, etc. These records can be generated by the transaction evaluator, the merchant or its agent, the card network, the issuers, etc. Record updates can be transmitted via the computer networks used to carry payment-related information, send via modem, entered manually, etc. and can be digitally signed or otherwise protected cryptographically to prevent tampering or errors.

B. Exemplary Transactions

This section describes the processing sequence involved in processing exemplary transactions.

The following is an exemplary transaction using one embodiment of the invention. Note that the specific steps and their ordering can vary between transactions or embodiments.

(a) A customer visits a merchant's web site and selects $100 worth of items to purchase.

(b) The merchant's web site sends a form to the user's browser with two entries for payment instruments and offers the customer free shipping if two payment methods are supplied.

(c) The customer enters a credit card number as a first payment option and checking account details (including the bank routing number and account number) as a second payment option. In addition, the customer enters a shipping address, credit card billing address, e-mail address, and/or telephone number.

(d) The merchant's web site receives the payment method data and recognizes that two payment methods have been supplied.

(e) Payment information, including the transaction amount and payment method, is transmitted via a computer network (such as the Internet, or a leased line) from the web server to a transaction evaluator. Other data (such as the addresses, information about what was purchased, etc.) are also sent to help with processes such as transaction approval and risk management.

(f) The transaction evaluator identifies the issuer of each payment method and identifies the business rules for processing each transaction.

(g) The transaction evaluator analyzes each transaction:
   (i) For the credit card option, the transaction evaluator transmits information including the card number and the transaction amount ($100) to the credit card issuer. In this example, the credit card issuer offers a rebate of $1.20 for the transaction and additionally offers to take the risk if the transaction is fraudulent and/or repudiated by the customer. If the merchant's (standard) discount rate is 3% for transactions on the credit card network, the net transaction processing terms correspond to receiving $98.20 for the $100 transaction (i.e., a net discount rate of 1.8%, not including amounts due to the transaction evaluator).
   (ii) For the electronic checking account debit option, in this example there happens to be no special business relationship between the issuing bank and the transaction evaluator. The standard terms for a checking account debit thus apply. In this example, this charge is assumed to be 50 cents, plus the merchant bears the risk if the account is over-drawn. Based on past history with the customer, transaction details, etc., the transaction evaluator and/or risk management systems to which it is connected assign a cost of $1.50 for this risk. The expected net transaction processing terms thus correspond to receiving $98.00 for the $100 transaction.

(h) The transaction evaluator selects the credit card as the preferred transaction processing method, since the checking account transaction has an estimated average discount rate of 2 percent as opposed to 1.8 percent for the credit card transaction.

(i) The transaction evaluator notifies the merchant web server that the first payment option (i.e., the credit card) was selected and notifies the merchant that $97 should be received from the issuer and that the merchant will receive a rebate of $1.10. The remaining $0.10 of the rebate is kept by the transaction evaluator, as shown in steps (k) and (n) below.

(j) The web server notifies the customer, obtains final customer authorization for the charge (if necessary), and processes the credit card payment to the credit card acquirer.

(k) The accounting systems receive notification from the transaction evaluator that a $1.20 rebate is expected from the credit card issuer, of which $1.10 is owed to the merchant.

(l) The merchant provides the goods/services ordered by the customer.

(m) The normal transaction processing occurs (i.e., the acquirer submits the transaction to the credit card network, which in turn submits the transaction to the issuer, which pays the network and bills the customer. The network then pays the acquirer who pays the merchant.)

(n) The accounting systems receive a $1.20 rebate from the issuer and pay $1.10 to the merchant via the merchant's bank. These payments may be aggregated with other payments or rebate amounts in a batched fashion.

If the transaction was submitted to the accounting systems before the credit card network, the accounting systems may also need to receive confirmation that the transaction processing was successful. If the credit card transaction later fails to go through, business relationships may be structured so that no refunds are granted, in which case the transaction processing systems would, preferably automatically, notify the accounting systems so that no rebate would be expected. Note that the term "automatically" includes both processes that are fully automated as well as processes that involve a combination of automated (e.g., computer-implemented) steps and manual steps.

The following is another exemplary transaction using one embodiment of the invention. Note that in all examples, the specific steps and their ordering can vary between transactions or embodiments. The following transaction sequence, which is shown in FIG. 3, can be used by a variety of merchant types, including without limitation conventional retail, mail order, on-line/Internet, etc.

(a) A customer contacts a merchant and selects $100 worth of items to purchase.

(b) At step 300, the merchant's representative or automated system provides the customer with the opportunity to provide two payment instruments and (optionally) offers an incentive if two payment methods are supplied. In addition, the customer may also provide other data such as billing address(es), contact and shipping information, etc.

(c) At step 305, the customer provides one or more payment methods.

(d) At step 310, the merchant determines whether the customer supplied two methods. If only one method was supplied, the transaction is completed in the conventional manner at step 315 using the payment method supplied.

(e) Otherwise, the customer supplied two payment methods. In this example, the customer provided two different credit card numbers.

(f) The merchant verifies that both instruments are valid for the transaction (e.g., by obtaining payment authorizations for each credit card).

(g) The transaction amount and payment method information are transmitted electronically (including without limitation via a computer network such as the Internet, via a leased line, etc.) to a transaction evaluator. Other data (such as the customer's address, information about what was purchased, the customer's photograph, etc.) can also be sent to help with processes such as transaction approval and risk management.

(h) At step 320, the transaction evaluator identifies the issuers of each payment method and identifies the business rules for processing each transaction.

(i) At step 325, the transaction evaluator sends information about the transaction to each of the issuers or, if the issuers are not participating or are not connected, the data is sent to systems for computing the transaction benefit (or, more generally, economic utility, as described in Section D) for each payment method:

(i) For the first payment method, the transaction evaluator determines that the card belongs to a participating issuer that is able to perform real-time transaction analysis. The transaction evaluator therefore sends the transaction data to the issuer at step 330. If no suitable reply is received, then the transaction evaluator assumes at step 332 that the default transaction processing terms defined by the payment network apply. Otherwise, at step 335, the issuer offers transaction terms or preferences. In this example, the credit card issuer offers a rebate of $0.50 for the transaction. If the merchant's discount rate is 3% for transactions on the credit card network, the net transaction processing terms corresponds to receiving $97.50 for the $100 transaction.

(ii) For the second credit card transaction, the transaction evaluator determines in this example at step 340 that the credit card issuer does not participate in the service. As a result, at step 345, the transaction evaluator determines the normal terms for processing the transaction. In this example if the merchant's discount rate is 3% for transactions on the credit card network, the net transaction processing terms corresponds to receiving $97.00 for the $100 transaction.

(iii) At step 350, the transaction evaluator selects the first credit card as the preferred transaction processing method, since the first credit card was with a participating issuer and offers the greatest transaction benefit.

(j) At step 360, the transaction evaluator notifies the merchant that the first payment option (i.e., the credit card) was selected and notifies the merchant that $97 should be received from the issuer and that the merchant will receive a rebate of $0.45. The remaining $0.05 of the rebate is kept by the transaction evaluator, as shown in steps (l) and (o) below.

(k) At step 370, the merchant notifies the customer which instrument was selected, obtains final customer authorization for the charge (if necessary), and processes the credit card payment to the credit card acquirer using the authorization previously obtained using the selected credit card. The other (unused) authorization is released.

(l) The accounting systems receive notification from the transaction evaluator that a $0.50 rebate is expected from the credit card issuer, of which $0.45 is owed to the merchant.

(m) The merchant provides the goods/services ordered by the customer.

(n) The normal transaction processing occurs (i.e., the acquirer submits the transaction to the credit card network, which in turn submits the transaction to the issuer, which pays the network and bills the customer. The network then pays the acquirer who pays the merchant.)

(o) The accounting systems receive a $0.50 rebate from the issuer and pays $0.45 to the merchant bank. These payments can be aggregated with other payments or rebate amounts, in a batched fashion.

The following is yet another exemplary transaction using an embodiment of the invention.

(a) A customer visits a merchant location and selects $100 worth of items to purchase.

(b) The merchant's representative, sales or check-out clerk informs the customer of their option to provide two or more payment instruments and (optionally) offers an incentive if two payment methods are supplied. In addition, the customer may also provide an identity card, domicile address(es), contact information, etc.

(c) The customer provides one or more payment methods.

(d) The merchant or its representative determines whether the customer supplied two methods. If only one method was supplied, the transaction is completed in the conventional manner using the payment instrument supplied.

(e) Otherwise, the customer supplied two payment methods. In this example, the customer provided two different credit card numbers. The customer or the merchant's representative supplies the information concerning the payment instrument(s) to a merchant terminal (e.g., by swiping the credit cards).

(f) The merchant verifies that both instruments are valid for the transaction (e.g., by obtaining payment authorizations for each credit card) and optionally verifies that the instruments have different funding sources and/or issuers.

(g) The transaction amount and payment method information are transmitted electronically to a transaction intermediary, such as an authorizing network processor.

(h) The intermediary then transmits the payment instrument data to a transaction evaluator. Other data (such as the customer's address, information about what was purchased, etc.) can also be sent to help with processes such as transaction approval and risk management.

(i) The transaction evaluator identifies the issuers of each payment method and identifies the business rules for processing each transaction.

(j) The transaction evaluator sends information about the transaction to each of the issuers or, if the issuers are not participating or are not connected, the data is sent to systems for estimating the economic utility for each payment method:

(i) For the first payment method, the transaction evaluator determines that the card belongs to a participating issuer that is able to perform real-time transaction analysis. The transaction evaluator therefore sends the transaction data to the issuer. If no suitable reply is received, then the transaction evaluator assumes that the default transaction processing terms for the issuer apply. Otherwise, the issuer offers transaction terms or preferences. In this example, the credit card issuer offers a rebate of $0.50 for the transaction. If the merchant's discount rate is 3% for transactions on the credit card network, the net transaction processing terms corresponds to receiving $97.50 for the $100 transaction (not including any extra fees charged by the transaction evaluator, etc.)

(ii) For the second credit card transaction, the transaction evaluator determines that the credit card issuer does not participate in the service. As a result, the transaction evaluator determines the normal terms for processing the transaction. In this example if the merchant's discount rate is 3% for transactions on the credit card network, the net transaction processing terms corresponds to receiving $97.00 for the $100 transaction.

(iii) The transaction evaluator selects the first credit card as the preferred transaction processing method, since the first credit card has better economic utility.

(k) The transaction evaluator notifies the transaction intermediary that the first payment option (i.e., the first credit card) was selected.

(l) The transaction intermediary then notifies the merchant of the selection result.

(m) The transaction evaluator also notifies either the transaction intermediary or the merchant directly that payment will be $97 and should be received from the issuer and that the merchant will receive a rebate of $6.45. The remaining $0.05 of the rebate is kept by the transaction evaluator, as shown below.

(n) The merchant notifies the customer which instrument was selected, obtains final customer authorization for the charge (if necessary), and processes the credit card payment to the credit card acquirer.

(o) The accounting systems receive notification from the transaction evaluator that a $0.50 rebate is expected from the credit card issuer, of which $0.45 is owed to the merchant.

(p) The merchant provides the goods/services ordered by the customer and the normal credit card transaction processing occurs.

(q) The accounting systems receive a $0.50 rebate from the issuer and pay $0.45 to the merchant via the merchant bank.

Note that the order in which the steps are performed in the examples above can vary between embodiments and transactions, and that many steps can be performed in parallel. For example and without limitation, in the payment transactions above, the accounting system operations, rebate processing, and order fulfillment could all occur simultaneously. In addition, some steps are also optional. For example and without limitation, the steps of obtaining and releasing authorizations could be omitted. In general, then, the particular order and selection of steps for any particular implementation will depend on the particular requirements of the operational environment in which the implementation is deployed.

C. Reducing Merchant Risk

The methods and systems described herein need not expose transaction participants to any new risks. That is, the transaction evaluator's selection does not require any party to accept a transaction that it would normally reject. For example, payment methods which are not legitimately issued, which would not generally be acceptable to the merchant, which would not be voluntarily submitted by the customer, or which do not conform to all the current rules for processing, can be rejected by the merchant, transaction evaluator, issuer, or other participants.

The invention may actually serve to reduce payment risk for the merchant. The transaction evaluator can favor payment methods with lower risk, thereby reducing the number of high-risk transactions. In addition, transactions from customers who submit multiple payment methods are more likely to be paid if the merchant can collect using the secondary payment instrument if the first one fails. It is even possible to use one payment method to guarantee the other. For example, if a customer provides both a checking account and a credit card number and agrees that the secondary method may be charged if the primary one is rejected, the merchant can authorize (but not deposit) a transaction using the credit card then attempt to process a charge to the checking account. If the checking account transaction succeeds, the credit card authorization is not used. If the checking account transaction fails, however, then a charge can be issued against the credit card using the authorization. Thus, according to the invention, an authorization for a payment using one payment instrument can be used to ensure payment in case a transaction using a second payment instrument proves unsuccessful. In the case where the "backup" authorization is required, the customer is preferably informed (e.g., to allow the customer to rectify the negative situation), and may be charged a fee (e.g., to reimburse the merchant for the additional processing costs). Thus, if multiple payment methods that can be authorized are received, the merchant can obtain authorizations from the issuers of all of them as a way to reduce payment risk.

Having multiple payment methods can also help to reduce fraud losses. If someone trying to commit fraud provides multiple invalid payment methods, the transaction evaluator and/or issuer(s) can detect inconsistencies between the attributes of the respective payment methods or between order details and either payment method. For example, transactions can be rejected or subjected to additional scrutiny if the payment methods were issued to different people and/or different addresses, if an order's "bill to" address does not match either or both of the addresses corresponding to the payment methods, if the telephone numbers (or e-mail addresses, IP addresses, or other similar identifiers) of the customer do not match between the payment methods, etc. In some cases, one payment method may be difficult to verify (such as checks, where there is no widely-used real-time address verification system) but another (such as credit cards, for which address verification systems (AVS) are available) may support better authentication. If one payment method is successfully validated, confidence in the other can be increased. Similarly, if one method is shown to be invalid, the entire transaction can be rejected or analyzed more carefully. Thus, one payment method can be used to estimate the risk associated with another. In one embodiment, if the first payment method appears to be fraudulent or stolen, or is rejected or otherwise indicates a high probability of loss due to fraud or other reasons, the issuer of the secondary (unverifiable) payment instrument is notified so that future use of the second instrument can also be suspended until further verification can be performed.

One additional benefit is that the quality of transactions performed using the invention can be significantly higher than transactions that do not. For example, customers who present a high risk of nonpayment because they are nearing bankruptcy will be less likely to have secondary payment methods available. In addition, people attempting to commit fraud will generally supply only one payment method because finding two corresponding fraudulent payment methods is more difficult, and presenting two fraudulent payment methods increases the probability of detection. Also, merchant incentives for offering two payment methods may be of little or no additional benefit to someone expecting to go bankrupt or to a criminal using a stolen payment instrument. Thus, in one embodiment of the invention, more aggressive risk management and fraud detection methods are applied to transactions for which only one payment method was provided.

In another embodiment of the invention, the transaction evaluator (or a related system) can analyze the total risk characteristics of the combined payment methods and notify the merchant of the risk profile and/or adjust the merchant discount rate to reflect the risk. Alternatively, the transaction evaluator (or a third party) can accept liability for the transaction, or offer to accept liability from the merchant according to predefined terms, or offer transaction-specific terms for accepting the liability. In the latter case, the merchant would make a decision based on its own knowledge of the transaction and risk tolerance whether to accept this guarantee.

In another embodiment of the invention, the transaction evaluator (or a related system) can analyze the total risk characteristics of the combined payment methods and notify the payment instrument issuers of their risk profile (e.g. to help the issuers to formulate offers). Alternatively, the transaction evaluator (or a third party) can accept liability for the transaction, or offer to accept liability from the issuer according to predefined terms, or offer transaction-specific terms for accepting the liability. In the latter case, the issuer would make a decision based on its own knowledge of the transaction and risk tolerance whether to accept this guarantee. The transaction evaluator can similarly offer to accept risk from the merchant.

D. Transaction Cost/Benefit Analysis

The cost/benefit for processing any given transaction may vary greatly between issuers and payment instrument types. For example, the issuer of a checking account may wish to discourage transactions, since balances in low-interest checking accounts are profitable and there is generally little profit in processing checks or debits. As a result, the issuer of the checking account might pay 5 cents to avoid having to process a $100 transaction. Alternatively, a credit card issuer who receives 2 percent in interchange reimbursement fees and an average of 3 percent profit from interest on credit extended to the cardholder might pay 80 cents to receive a $100 transaction.

Additionally, there may be several ways to process transactions between a merchant and an issuer. For example, an issuer may authorize and/or encourage the use of non-traditional or non-standardized payment processing channels. For example, the issuer of a checking account may wish to discourage the use of ACH transactions in favor of a debit card transaction since there is generally less profit in processing an ACH debit compared to a debit card transaction. As a result, the issuer of the checking account might offer to pay 75 cents plus accept complete liability for a transaction in order to re-route the debit through an alternate channel. Alternatively, a credit card issuer wishing to establish their brand as the acceptance mark on the card could choose to forgo the 2 percent in interchange reimbursement fees and instead pay 50 cents to receive a transaction directly from the merchant (e.g., via an alternate processing network or directly over the Internet).

A variety of systems, including those employing neural networks, are used for credit and fraud risk assessment in the credit card industry. Credit card authorization requests are routinely processed by these systems, which evaluate the risk associated with the account and determine whether to accept or decline the transaction.

In one embodiment of the invention, these risk analysis systems are adapted to analyze both the risks and benefits of each transaction to produce quantitative estimates of the issuer "transaction benefit". The transaction benefit is defined as the value, as represented as an amount of money, that is expected to be made (if positive) or lost (if negative) if the transaction is processed. For example, a transaction with no revenue opportunity that will cost an issuer $1 to process has a transaction benefit to the issuer of minus one dollar. A more general measurement of the attractiveness of a transaction is its "economic utility," which represents the overall desirability of the transaction including both monetary (for example, and without limitation, transaction benefit) and non-monetary characteristics. Examples of non-monetary characteristics might include, without limitation, free advertising, co-marketing arrangements, contractual obligations, market positioning, building customer loyalty, commercial alliances, etc.

In one embodiment of the invention, similar risk analysis systems are adapted and applied to analyze both the risks and benefits of each transaction to produce quantitative estimates of the merchant transaction benefit. More generally, merchant economic utility can also be computed.

In one embodiment of the invention, economic utility and/or transaction benefit computations are performed based on information including (without limitation) the following or a subset of the following:

(a) the transaction date and time;
(b) the geographical location of the transaction and past transactions;
(c) the amount of the transaction;
(d) the currency of the transaction
(e) the merchant category and general type of goods/services bought;
(f) the specific goods and services purchased (if known);
(g) the merchant's identity and location and/or risk profile (if known);
(h) the customer's transaction history;
(i) the customer's billing address(es) and other known addresses;
(j) the customer's telephone number, e-mail, and/or network address;
(k) other verifying information or identification presented by the customer;
(l) the customer's payment history and creditworthiness;
(m) the customer's available account balance;
(n) the type of payment instrument involved;

(O) the customer's interest rate;
(p) the customer's tendency to carry interest-bearing balances;
(q) the transaction's likelihood of causing the customer to default on existing debt;
(r) whether the transaction will trigger fee-generating conditions (over-limit, etc.);
(s) anticipated customer service costs associated with the transaction;
(t) the likelihood of a charge-back or repudiation of the transaction;
(u) costs of billing the customer (e.g., if this is the first/only transaction in a billing cycle);
(v) the value of the overall customer relationship;
(w) benefits of having the customer's account active (e.g., for accounts that are inactive);
(x) alternate payment methods (if any) offered or available;
(y) the issuer and/or merchant financial objectives and risk tolerance.

Automated systems managing data required for such computations can be implemented using commercial databases (or extensions thereof) that are well-known to those skilled in the art. For example, a computer (such as the Sun Enterprise Server 420R) running an operating system (such as Sun Solaris) and relational database software (such as Oracle 7) may be employed with neural network software for performing issuer economic utility and/or transaction benefit computations. For automated transaction evaluators that require substantial computation power and must process a substantial volume of transactions, larger fault-tolerant computing clusters connected to redundant computer networks may be employed. At the other extreme, dedicated microcontrollers running simple operating systems such as VxWorks 5.4 can also be employed and are well-suited to simple transaction evaluators (such as those built into cash registers or simple merchant terminals).

Both transaction benefit and economic utility computations are preferably performed automatically. In one embodiment, one or more general purpose or specialized computers (which include without limitation processors, memories, I/O interfaces, etc.) are attached to one or more computer networks for receiving information about transactions and transmitting results. Such computer networks can be as simple as two computers connected using modems communicating over a telephone line or leased line, or can be complex associations of many computers connected by redundant data paths and routing systems. In one embodiment, the standard computer network provided by a payment network is employed, and the participating computers include issuer systems, merchant systems, and transaction evaluators.

In one embodiment of the invention, the issuer of a payment instrument receives information about a transaction for which multiple payment methods are available. The issuer estimates the economic utility then transmits to the transaction evaluator data describing the terms under which the issuer offers to process the transaction. For example, these terms might specify a rebate or discount if the transaction is provided to the issuer. If the transaction is undesirable, the terms might specify a rebate if the transaction is routed to a party other than the issuer.

In one embodiment of the invention, both (or multiple) issuers of payment instruments receive information about a transaction for which multiple payment methods are available. Each issuer estimates the economic utility then transmits to the transaction evaluator data describing the terms under which they offer to process the transaction. Based on predefined rules, the transaction evaluator may then either accept an offer, decline all offers, or decide to re-submit the transaction back to the issuers (e.g., with information concerning the other offers). Each issuer would then have the option to either modify the terms under which they offer to process the transaction or maintain their earlier offer. Thus, the transaction selection process can be performed by conducting an auction among the payment issuers, where the transaction is awarded to the issuer with the most attractive offer (i.e., the offer with the greatest economic utility to the merchant and/or the party operating the transaction evaluator).

In general, the amount of information provided to issuers can be determined by the transaction evaluator and/or merchant, based on business rules and contractual relationships with issuers. For example, the transaction evaluator might provide information to participating issuers about some payment methods (e.g., those from non-participating issuers), but provide no information about others.

E. Transaction Evaluator Rules

The transaction evaluator must normally select one payment method. In one embodiment of the invention, the transaction evaluator uses a list of preferred issuers, who receive preferential access to transactions. For transactions where neither issuer is preferred, a random or arbitrary selection mechanism may be employed. For transactions where one issuer is preferred and the other is not, the preferred issuer receives the transaction. For transactions where both issuers are preferred but the issuers are ranked differently, the transaction is assigned to the higher-ranking issuer. Finally, for transactions where both issuers are preferred and ranked identically, a random or arbitrary selection mechanism may be employed. If desired, the transaction evaluator can also maintain a list of issuers who should be avoided whenever possible. This transaction evaluator methodology is advantageous because it is simple and straightforward to implement, requires relatively little memory or computational effort, requires no network connectivity with issuers during transactions, and can be performed at the merchant location (e.g., by a transaction evaluator implemented in a credit card processing terminal or other point-of-sale terminal, a processor-driven cash register, a merchant web server, a merchant transaction server, etc.) using tables that only need to be updated when issuer rankings change.

In embodiments where payments using different types of payment instruments are compared, the transaction evaluator preferably adjusts for differences between the instruments. For example, the transaction evaluator can compensate for factors including, without limitation, payment network discount rates and other fees associated with each payment method, risks and/or guarantees associated with each payment method, settlement delays with each payment method, and the availability and cost of insurance for the transaction.

If connectivity with one or more issuers is available, the transaction evaluator can obtain from each connected issuer a value corresponding to the issuer's economic utility for the transaction, as described previously. Alternatively, economic utility computations can be performed by the transaction evaluator using rules acceptable to the issuer, or the computation can be done by a third party on behalf of the issuer. (More generally, any party to the transaction can outsource its actions by authorizing a third party or computer to make decisions on its behalf.) The economic utility estimates for the issuer may be adjusted by the issuer and/or the transaction evaluator to determine the amount the issuer is willing to pay (or must be paid) to process the transaction.

The transaction evaluator then adjusts the issuers' offers to compensate for differences between issuers and transaction processing mechanisms, such as:

(a) discount rates, processing charges, and fees associated with each transaction;
(b) settlement network or channel options;
(c) settlement times for each transaction;
(d) differences in risk with each transaction;
(e) the availability and/or cost of insurance covering the transaction;
(f) special business relationships with issuers (e.g., based on contractual obligations to provide a minimum transaction volume, lists of preferred or blacklisted issuers, etc.); and
(g) thresholds that issuer offers must meet to receive preferential transaction routing.

Based on the results from the above analysis, the transaction evaluator selects one payment method for the transaction. The transaction is then submitted for processing, typically by either the transaction evaluator or the merchant, and the customer is notified which payment method was selected. Based on the issuer offer, transaction data, and payment network rules, the transaction evaluator and/or accounting systems also compute the discount rates, rebates, fees, etc. expected, due, and/or paid for the transaction, and may also keep records of transaction summaries or details.

The methods used to calculate rebates and other transaction details from issuer offers and merchant economic utility computations depend on the transaction and the embodiment. As a first example, consider a transaction where two different checking account transactions were offered. The two payments have identical terms except that the issuer of the first account offers a 10-cent rebate to receive the transaction, while the issuer of the second account offers 7 cents to avoid processing the transaction. Depending on the transaction evaluator embodiment and the business rules with the issuers, possible outcomes include, without limitation, charging both issuers (for a total of 17 cents), charging 10 cents to only the first issuer, charging 7 cents to the first issuer (charging the amount of second-highest bid), charging 7 cents to the second issuer, charging 3 cents to the first issuer and 7 cents to the second issuer, etc.

As a second example, consider a transaction where two payments are offered with identical terms except that a first issuer offers a 10-cent discount on a given transaction while a second issuer offers a 20-cent discount. Depending on the transaction evaluator embodiment and the business rules with the issuers, possible outcomes include, without limitation, charging the second issuer 20 cents (the offer amount), 10 cents (the amount of second-highest offer), and charging 15 cents (the average of the offers).

As a third example, consider the previous example only where the second transaction now includes a nonpayment risk that the transaction evaluator estimates should cost 10 cents to insure (or self-insure). Although the two transaction methods are different, it would be appropriate to charge the issuer who receives the transaction the amount of their offer, although other rules could be applied as well.

One factor to consider when establishing selection and accounting rules is that always charging the highest offered amount encourages participants to make the smallest possible offers to have a chance of receiving the transaction, even if the transaction benefit is relatively high. In contrast, rules that base the final cost on the second offer encourage offers of the full transaction benefit. Thus, the final transaction terms can depend on the amounts of all offers received. Alternatively or in addition, a minimum offer amount (which can be fixed or computed from the transaction amount and details) may be required for an issuer to gain any preferential access to transactions. Some issuers may also pay a monthly amount to receive preferential access to transactions. Note that the business relationships between the transaction evaluator and different issuers can be structured differently, although the transaction evaluator must still be able to select one payment instrument to process each transaction.

In one embodiment, the transaction evaluator is implemented as a microprocessor connected to a network interface. At least one memory; which can be a volatile memory or a nonvolatile memory (such as battery-backed RAM, EEPROM, hard drive, etc.) is connected to the microprocessor and stores the data (data records) that include the tables and software (e.g., machine language instructions, interpretable code such as Java, etc.) implementing the transaction evaluator payment method selection processes. The tables included in the data can, without limitation, identify issuers (e.g., by BIN), identify and/or ranking preferred issuers, identify and/or rank blacklisted issuers, define default processing terms for issuers, define network addresses for contacting issuers, include public/private keys (including root keys for certifying authorities) and other data required to for secure communications. The software implemented in the memory can provide functionality including without limitation functions for identifying the issuer of a particular payment method, (optionally) contacting issuers to obtain transaction-specific processing terms, notifying merchant terminals which payment method was selected, interacting with accounting systems to ensure proper auditing and billing, and receiving and validating updates to transaction evaluator tables/software. The network interface to the transaction evaluator can be any proprietary or standard interface including without limitation 10/100 megabit Ethernet, modem, leased line, Internet/web, local wireless, radio, digital satellite, keyboard, voice prompt, etc. Multiple network interfaces may be employed if necessary (e.g., if different parties in the transaction use different networks and/or protocols). If the transaction evaluator is responsible for depositing transactions (e.g., with acquirers), additional network interfaces may be required for this task.

F. Soliciting Multiple Payment Methods

A merchant's request (solicitation) for one or more secondary payment methods can require effort and/or a small (but non-negligible) cost to the merchant. For example, in a busy check-out line, the delay introduced by requesting a secondary payment method may not be worthwhile to the merchant on a small transaction. In contrast, if the check-out line is not busy, asking for a secondary payment method could be worthwhile. Similarly, if communication costs are high, the cost of connecting to an independent transaction evaluator may exceed the benefits for that transaction. In other cases, the merchant may already know what transaction methods are supported by (or likely to be supported by) the customer and knows (for example) that it is unlikely that a secondary acceptable payment method will be available. In still other cases, the first payment method offered by a customer may provide sufficiently favorable terms that asking for additional payment methods is unnecessary. As a result, in one embodiment of the invention, the merchant and/or transaction evaluator systems analyze the information available to determine whether to request multiple payment options. A request for multiple payment methods is only made if the estimated economic utility justifies it.

In an alternate embodiment, the merchant and/or transaction evaluator obtains and analyzes a first payment instrument then makes a decision as to whether to request a secondary payment instrument from the customer. Thus, a request for additional payment methods is only made if the estimated economic utility justifies it.

G. Reliability

Participants in payment processing networks demand high levels of reliability and availability. Outages can cause issuers, acquirers, and the payment networks to lose money due to lost transaction volume, while merchants can lose the ability to conduct transactions, obtain payment authorizations, or use particular payment methods. As a result, payment systems and their adjunct information services and systems need to be extremely reliable.

The methods and systems described herein can be implemented so that they do not reduce the reliability of the payment systems. For example, if the transaction evaluator fails to provide a timely selection (e.g., due to network outages, equipment failures, network delays, inaccessibility of issuer systems, etc.), then the transaction can still proceed by allowing the merchant to, for example, arbitrarily select one of the payment methods offered by the customer. In fact, reliability can be improved by providing back-up payment methods that can be employed if the preferred method is unavailable.

H. Security

Participants in payment processing networks demand high levels of security, data integrity and confidentiality. Vulnerabilities in messaging and data storage systems may introduce conditions or situations which can cause customers, issuers, acquirers, and the payment networks to lose money or face other risks if inappropriate access, observation, or possession of transaction, customer, acquirer, issuer or payment network data occurs. As a result, payment systems and their adjunct information services and systems need to be extremely secure. The methods and systems described herein can be implemented without reducing the security of the payment systems by using data encryption, secure hardware, digital signatures, PIN pads, and/or still other secure transaction processing methods known in the background art.

I. Payment Method Indexing

In an alternate embodiment of the invention, the customer is provided with a unique identifying value at the conclusion of a first transaction, where this value identifies the payment method(s) used by or supported by the customer. For example, this information could be (without limitation) a web browser cookie, an identifier value provided on a sticker for placing on a bank card, an alphanumeric identifier, etc. In subsequent transactions (with the same merchant or with other participating merchants), the customer can supply this identifier value to avoid having to re-supply information about all supported payment methods. In addition, the identifier value could be used to index other relevant information, such as the customer's shipping address, frequent flier number (or other reward account), telephone number, network address, e-mail address, etc. Using an index of this type provides both convenience and security benefits, since account numbers and other transaction-related data do not need to be sent with every transaction. In addition, payment verification is streamlined because corroborating information (such as addresses) is already stored.

In an alternative embodiment, instead of issuing a new identifying value to the customer, the customer payment information (and other customer data) is indexed by a value supplied by the customer. For example, the transaction evaluator can use a telephone number, e-mail address, processor serial number, or other value associated with a customer to locate records from previous transactions and determine additional customer information such as shipping addresses and alternate payment methods.

In an alternative embodiment, the customer can provide authorization to access a credit report or any other record from a (public or private) database operated by a third party. From this report or record, the transaction evaluator and/or merchant can identify payment methods supported by the customer, then either (a) select one of these methods, or (b) let the customer select a subset of methods from which the transaction evaluator will select a method. Examples of such databases include without limitation credit reporting agencies and payment wallet operators. Note that this database does not need to be centrally operated. For example, the record can be carried in (without limitation) a customer's smart card, PDA (such as a Palm Pilot), cellular telephone, or personal computer.

As an example, consider a transaction where the customer had previously provided two different payment instruments, a checking account and a credit card, and received a unique identifier issued by the transaction evaluator. The customer then presents herself to a previously unused merchant and submits her identifier. The transaction evaluator for the new merchant validates the identifier and determines (and/or verifies) the customer's payment methods for the new transaction.

As a separate example, consider a transaction where the customer had previously stored the information concerning several different payment instruments in the memory of their personal computer or other personal device (such as a PDA). The customer then presents herself to a merchant and provides the merchant with the ability to access data in (or from) her device. The merchant or the transaction evaluator then accesses data in (or from) the device, yielding information identifying multiple offered payment instruments, and selects a payment instrument to use to consummate the transaction.

In an another embodiment, the customer stores information concerning at least two different payment instruments in the memory of a database, such as a web-based wallet. The customer then presents herself to a merchant and offers access to the wallet record in response to the merchant's solicitation for multiple payment instruments. The merchant or the transaction evaluator then accesses that record, selecting from among multiple appropriate payment instruments described in the wallet one to use when consummating the transaction. Alternatively the customer may simply authorize the merchant or transaction evaluator to access their records at (or obtained from) a public credit reporting agency so that the transaction evaluator can select a payment instrument.

J. Alternative Embodiments and Applications

Embodiments of the invention can support any type or combination of appropriate payment instruments. Examples of payment instruments that can be supported include, without limitation: (a) cash; (b) checks; (c) credit cards; (d) debit or ATM cards; (e) prepaid bank cards; (f) other payment or bank cards; (g) electronic cash; (h) loyalty points, script, barter units, or other unofficial payment schemes; (i) coupons; (j) gift certificates; (k) securities transfer; (l) equity instruments; (m) customer agreement to be billed later (e.g., by the merchant); and (n) credit extended by a merchant. In some embodiments, only specific combinations of supported payment instruments may be allowed. For example, a web-based system may require that one payment method be a credit card, but allow the other method to be a credit card, checking account, or cash-on-delivery (COD) shipment.

An important aspect of the invention is that it allows payment instrument issuers to compete for desirable transactions. Such competition is most effective if the candidate payment instruments have different funding sources. (Examples of funding sources include bank accounts, credit lines, and bond guarantors.) For example, two debit cards linked to the same account share a funding source and thus generally do not present a significant competitive opportunity because the same issuer will handle the transaction in either case. In contrast, two ATM (debit) cards linked to different accounts have different funding sources and present a much greater issuer opportunity. Note that the invention can be useful in the case where two funding sources from the same issuer are supplied by a customer. For example, an issuer who has provided to a low-risk customer both a debit card (whose funding source is a bank account) and a credit card (whose funding source is a line of credit) might prefer to direct transactions to the credit card to gain higher interchange fees and the possibility of collecting additional interest income.

Payment methods can be denominated in any currency or combination of currencies. (The use of dollars in examples is, of course, exemplary.) If multiple currencies are involved, transaction evaluators can adjust decisions for factors such as exchange rates, market fluctuations, issuer/acquirer/merchant preferences, net positions (e.g., to minimize actual currency conversions required), risk, etc. Note that it may not be necessary for all parties to a transaction to be aware of currency conversions, provided that the transaction evaluator, payment network, issuer, or some other participant has the capacity to perform the foreign exchange and absorb any associated financial risk. In an alternative embodiment, the transaction evaluator can select which of two or more currencies will be used when charging an amount to a customer. Thus, the customer can be given the option of providing alternative forms of payments with each form in a different currency (e.g., dollar-denominated credit card payments vs. a check in British pounds). If the merchant has a currency preference, the transaction evaluator can compensate in the selection process. Similarly, if issuers have a currency preference, they can specify their preferences and/or provide offers for the transaction in multiple currencies.

In one embodiment of the present invention, customer interaction (e.g., requesting multiple payment methods, entering information about the payment methods into a computer terminal, etc.) is performed via electronic communications with the customer. Examples of such communication includes without limitation voice telephony, modem, Internet, world wide web, electronic mail, leased line, video teleconference, facsimile, radio, wireless (e.g., between a PDA or cell phone and merchant terminal), etc. In one such embodiment, customer communication is via telephony using an operator at a call center. The operator has a computer system configured to accept two or more payment methods offered by the customer. The operator computer is connected via a computer network to a transaction evaluator, which selects one of the payment methods supplied. The operator computer can also perform other tasks, including without limitation obtaining from a database information about products or services (e.g., airline schedules, computer system component descriptions, etc.), recording customer orders, order tracking, etc. Alternatively, the transaction evaluator can be implemented in the operator computer. The payment transaction, using the selected payment method, is then deposited via a transaction server. In addition, the operator computer can be configured to prompt the operator (e.g., with scripted dialog) to request a secondary payment method only for transactions where the economic utility associated with having multiple payment methods justifies the time and expense of requesting and receiving additional payment information from the customer. As a reward for requesting additional payment methods, operators can be automatically paid a commission for obtaining secondary payment methods.

Alternatively the call center may be implemented using computer-driven automated voice or data response units. In this case, the user would be automatically solicited to provide information describing two or more payment instruments. The user then provides payment instrument information to the call center systems (e.g. by speaking to a voice recognition unit, entering values using a touch tone telephone to a DTMF decoder, using a smart card enabled telephone to digitally send payment information, etc.). The call center systems then select a payment instrument, process the customer's payment, and fulfill the order using methods like those described herein for other merchant environments.

Note that a request for multiple payment methods can occur before any payment methods are supplied or can occur after a first payment method has been supplied and analyzed. For example, if the first method has favorable processing terms, it may not be necessary to request additional methods.

In an alternative embodiment, if only one payment method is supplied by the customer, the merchant can offer a reward (which can be identical to an incentive offered for providing multiple payment methods or can be a different reward) for completing an application form for additional payment methods. The reward can be given to anyone who completes the application form, or can be contingent on properly completing the form, or can be contingent on actually receiving and/or using a new payment instrument. Customers are likely to be receptive to this offer, since having additional payment methods will enable them to take advantage of the rewards offered by merchants using the present invention. In addition, customers with only one payment method are likely to be under-served and therefore be interested in obtaining a secondary payment instrument. Finally, this offer can benefit participating issuers (who gain new customers), merchants (who can receive rewards from issuers for signing up new customers), and the transaction evaluator (who will potentially be able to make choices in future transactions by the customer).

In one embodiment, the transaction evaluator can evaluate multiple processing options for one or more payment methods. For example, by maintaining relationships with multiple acquirers or transaction processors, the transaction evaluator can route transactions to the parties who will profit most from the transactions and/or who offer the most favorable terms. Alternatively, desirable transactions can be routed to participating transaction processors (acquirers) and undesirable transactions can be routed to non-participating (or blacklisted) processors.

In another embodiment, transactions can bypass conventional processing networks altogether by (for example) supplying transaction information to the issuer via an Internet connection. In this case, the transaction evaluator (or a separate component responsible for processing transactions) can maintain routing tables and algorithms for identifying issuers of particular payment instruments, determining whether alternate transaction processing methods are available, determining a network address (such as an IP address) or other routing information corresponding to the issuer (or other party responsible for conducting transactions on behalf of the issuer), and conducting the transaction with the issuer (or other party). In some cases, such as ATM cards, where general association or network rules may impose specific transaction requirements (such as a PIN at the point of sale), direct relationships with issuers and/or separate transaction processing methods can be particularly advantageous by allowing these rules to be bypassed.

In one embodiment, the merchant can split a transaction among multiple payment methods. Such an approach could be advantageous in unusual cases where one or niore payment methods cannot accommodate the entire transaction amount or where multiple smaller transactions incur total fees that are lower than one larger transaction. Factors that must be considered when splitting transactions include payment network rules (that may prohibit the splitting of transactions) and the increased complexity of user interfaces and user interaction for refunds or dispute resolution.

If any communications are conducted over the Internet (or any other possibly insecure network), these communications are preferably encrypted and authenticated. Protocols (such as SSL 3.0) and cryptographic algorithms for securing communications over untrusted networks are well known in the background art.

In one embodiment of the invention, if a cardholder indicated their interest in supplying a second payment instrument, but was unable for any reason to do so, the merchant and/or transaction evaluator could provide access to instant credit granting services. These services may be traditional credit cards (e.g., with instant or rapid approval times) or alternative payment mechanisms such as private label credit accounts, non-credit payment cards, or other appropriate instruments.

In another embodiment of the invention, the merchant and/or transaction evaluator could analyze the payment option(s) offered and suggest to the customer alternative credit or payment instrument issuing services, such as those offering more favorable customer terms. These services may be traditional credit cards (e.g., with instant approval times) or it may be alternative payment mechanisms, such as private label credit accounts, non-credit payment cards, etc. Alternatively or in addition, information about customer offers and transactions can be supplied to issuers or third parties for marketing or advertising purposes (although such data sharing must be performed carefully to respect privacy policies and customer expectations of privacy). Also, issuer offers can include bids for additional information. Similarly, third parties can be provided with (or given the opportunity to bid on) transaction data. Before sharing any customer data, customers are preferably notified and given the opportunity to opt out.

In various embodiments of the invention, the role of the transaction evaluator can be performed by a third party or by the transaction acquirer, the merchant, an issuer, a payment network, or any other party involved in (or potentially involved in) the transaction. In various embodiments, the transaction evaluator decision process can be (without limitation) performed by the merchant's cash register, credit card terminal (or other payment systems or point-of-sale terminal), independent computer systems, the merchant's web server, a computer or server connected to the merchant's web server or point-of-sale systems, by a machine connected via a computer network (or other electronic communication means) to the merchant location, etc.

The transaction evaluator can act as a payment gateway. For example, the transaction evaluator can be responsible for processing the transaction using the selected payment method, collecting payment from the issuer (e.g., via a payment network), and paying the merchant. The transaction evaluator can also handle the customer interface, for example by serving secure web pages to customers where customers can enter multiple payment methods.

The information supplied by customers identifying offered payment instruments does not need to include all information the customer has concerning the payment instrument. For example, a bank identification number (typically the first digits of a credit card number) may be sufficient identification of a payment instrument for a transaction evaluator or issuer to evaluate payment terms and make a decision. In this case, the rest of the credit card number would be required for the selected payment instrument, but would not be required for payment methods that are not selected. Obtaining less information can help to mitigate customer privacy concerns and/or reduce the amount of time per transaction.

The terms "customer" and "merchant" are used generally to refer to the parties of a transaction. For example, the customer and merchant may be parties of any type, including, without limitation, individuals, businesses, organizations, etc. The methods and systems described herein can be applied to purchases of all types, including without limitation mail-order, Internet, retail ("bricks and mortar"), vending machines, pre-authorized bill payments, subscriptions, business-to-business, business-to-consumer, consumer-to-consumer, etc. Payments can be for any types of goods or services, including (without limitation) purchases and payments for computers, furniture, automobiles, jewelry, industrial equipment, real estate, airplane tickets, car rentals, hotels, tax debts, landscaping services, groceries, rent, etc.

In cases where exemplary embodiments have been described that include conditional decisions, it is anticipated that multiple transactions may be performed and that these multiple transactions may include processing using different conditional decisions.

All of the foregoing illustrates exemplary embodiments and applications of the invention, from which related variations, enhancements and modifications will be apparent without departing from the spirit and scope of the invention. Therefore, the invention should not be limited to the foregoing disclosure, but rather construed by the claims appended hereto.

What is claimed is:

1. A method for charging a payment transaction to a customer, said method comprising the steps of:
  (a) offering an incentive to identify a plurality of payment instruments usable to consummate said transaction;
  (b) obtaining from said customer information describing at least two payment instruments from said plurality of payment instruments identified by said customer, wherein:
    (i) said customer is willing to allow said payment transaction to be processed using any of said described payment instruments,
    (ii) said described payment instruments utilize different funding sources, and (iii) each of said described payment instruments is usable for processing said payment transaction in its entirety;

(c) submitting information regarding said described payment instruments to a computer-implemented transaction evaluator configured to automatically select one of said described payment instruments based on relative economic utility of said described payment instruments;

(d) receiving from said transaction evaluator the transaction evaluator's selection of one of said described payment instruments;

(e) notifying said customer which of said payment instruments was selected; and (f) receiving funds for the payment of said transaction using said selected payment instrument.

2. The method of claim 1 where, in said step (c), said relative economic utility is that to a merchant performing a least said step (a).

3. The method of claim 1 comprising the additional step prior to at least said step (f) of electronically transmitting to a payment network data identifying at least said selected payment instrument and the amount of said transaction.

4. The method of claim 3 comprising the additional step after at least said step (d) of receiving confirmation from said payment network that said payment transaction was processed successfully.

5. The method of claim 1 further comprising the step of obtaining from said customer explicit authorization to process said payment transaction using said selected payment instrument.

6. The method of claim 5 where said explicit authorization includes a signature.

7. The method of claim 1 where said steps (a), (b), and (e) are performed via electronic communication with said customer.

8. The method of claim 7 where said electronic communication includes using an automated telephony-based response system.

9. The method of claim 7 where at least said step (a) includes sending a form over the Internet to a web browser operated by said customer.

10. The method of claim 1 further comprising the additional step after said step (c) of said transaction evaluator comparing estimated transaction benefit values associated with each of said described payment instruments and selecting the one of said payment instruments with the greatest transaction benefit.

11. The method of claim 1 comprising the further steps after at least said step (b) of:
(i) transmitting information about said payment transaction to a computer authorized to represent the issuer of at least one of said described payment instruments, and
(ii) receiving in response from said computer a first offer describing the terms under which said issuer is willing to process said payment transaction.

12. The method of claim 11 where said offer must meet a predefined minimum amount for said issuer to be granted priority in receiving said payment transaction.

13. The method of claim 11 comprising the further steps of:
(i) receiving from the issuer of a second of said described payment instruments a second offer;
(ii) identifying which of said first offer and said second offer provides a greater transaction benefit; and
(iii) accepting the more favorable of said offers.

14. The method of claim 13 comprising the further step of computing the terms for said payment transaction as a function of both said first offer and said second offer.

15. The method of claim 1 wherein the selection of step (d) comprises:
(i) conducting an automatic electronic auction among issuers of said described payment instruments;
(ii) identifying a winner of said auction; and
(iii) selecting the one of said described payment instruments issued by said winner.

16. The method of claim 1 comprising the additional step of updating records containing payment instrument selection criteria utilized by said transaction evaluator.

17. The method of claim 16 where said records include a list of payment processing terms for payment instruments from preferred issuers.

18. The method of claim 16 where said records include:
(i) routing tables containing communications network information corresponding to a plurality of payment instrument issuers; and
(ii) software for analyzing responses received from said plurality of issuers.

19. The method of claim 1 comprising the additional step after at least said step (c) of receiving from an issuer of at least one of said described payment instruments an incentive based on which of said described payment instruments is selected.

20. The method of claim 19 where said incentive includes a payment guarantee to accept risk associated with said transaction.

21. The method of claim 19 where said incentive includes a payment for processing said transaction using a payment instrument from an issuer other than the issuer providing said incentive.

22. The method of claim 1 comprising the additional step after said step (c) of analyzing and comparing the risk associated with at least two of said described payment instruments, as part of assessing said relative economic utility of said described payment instruments.

23. The method of claim 22 including using information from at least one of said described payment instruments to estimate risk associated with another of said described payment instruments.

24. The method of claim 1 where said step (f) is performed before said step (e).

25. The method of claim 1 comprising the additional step after at least said step (b) of obtaining transaction authorizations for the amount of said payment transaction from issuers of each of said described payment instruments.

26. The method of claim 1 where said transaction evaluator is operated by a merchant performing at least said step (a).

27. The method of claim 1 where said transaction evaluator is located in a server connected to the Internet.

28. The method of claim 1 comprising the additional step prior to said step (a) of
receiving an order from said customer;
based on said order, determining that it is advantageous to request multiple payment instruments from said customer;
and comprising the additional steps after said step (f) of
receiving a second order from a second customer;
based on said second order, determining that it is not advantageous to request multiple payment instruments from said second customer;
soliciting from said second customer a single payment instrument; and receiving from said second customer information describing a single payment instrument.

29. The method of claim 1 performed using a computer staffed by an operator communicating via telephone with said customer who is placing an order.

30. The method of claim 1 where said solicited payment instruments are of different types.

31. The method of claim 1 where said described payment instruments are credit cards from different issuers.

32. The method of claim 1 comprising the additional step of updating records in a computer-based accounting system to reflect an amount due from the issuer of said selected payment instrument.

33. Apparatus for charging a payment transaction to a customer, said apparatus comprising:
  (a) means for offering an incentive to identify a plurality of payment instruments usable to consummate said transaction;
  (b) means for obtaining from the customer information describing at least two payment instruments from said plurality of payment instruments identified by said customer, wherein:
    (i) said customer is willing to allow said payment transaction to be processed using any of said described payment instruments,
    (ii) said described payment instruments utilize different finding sources, and
    (iii) each of said described payment instruments is usable for processing said payment transaction in its entirety;
  (c) means for submitting information regarding said described payment instruments to a computer-implemented transaction evaluator configured to automatically select one of said described payment instruments based on relative economic utility of said described payment instruments to an entity from the group of entities consisting of a merchant interfacing with the customer and an issuer of a described payment instrument;
  (d) means for receiving from said transaction evaluator the transaction evaluator's selection of one of said described payment instruments; and
  (e) means for outputting which of said payment instruments was selected.

34. The apparatus of claim 33 where said elements (a), (b), and (e) are configured for electronic communication with said customer using an automated telephony-based response system.

35. The apparatus of claim 34 further comprising means for connecting to the Internet.

36. The apparatus of claim 33 wherein said transaction evaluator is configured to compare estimated transaction benefit values associated with each of said described payment instruments and select the one of said payment instruments with the greatest transaction benefit.

37. The apparatus of claim 35 further comprising:
  (i) means for transmitting information about said payment transaction to a computer authorized to represent the issuer of at least one of said described payment instruments, and
  (ii) means for receiving in response from said computer a first offer describing the terms under which said issuer is willing to process said payment transaction.

38. The apparatus of claim 37 further comprising:
  (i) means for receiving from the issuer of a second of said described payment instruments a second offer;
  (ii) means for identifying which of said first offer and said second offer provides a greater transaction benefit; and
  (iii) means for accepting the more favorable of said offers.

39. The apparatus of claim 33 wherein the transaction evaluator comprises:
  (i) means for conducting an automatic electronic auction among the issuers of said described payment instruments;
  (ii) means for identifying a winner of said auction; and
  (iii) means for selecting the one of said described payment instruments issued by said winner.

40. The apparatus of claim 33 further comprising a memory containing:
  (i) payment instrument selection criteria;
  (ii) payment processing terms for payment instruments from preferred issuers;
  (iii) communications network information corresponding to a plurality of payment instrument issuers; and
  (iv) software for analyzing responses received from said plurality of issuers.

41. The apparatus of claim 33 further comprising means for receiving from an issuer of at least one of said described payment instruments an incentive based on which of said described payment instruments is selected.

42. The apparatus of claim 33 further comprising means for analyzing and comparing the risk associated with at least two of said described payment instruments, and for using information from at least one of said described payment instruments to estimate risk associated with another of said described payment instruments.

43. The apparatus of claim 33 further comprising means for:
  receiving an order from said customer;
  based on said order, determining that it is advantageous to request multiple payment instruments from said customer in said element (a); and means for:
  receiving a second order from a second customer;
  based on said second order, determining that it is not advantageous to request multiple payment instruments from said second customer;
  soliciting from said second customer a single payment instrument; and
  receiving from said second customer information describing a single payment instrument.

44. The apparatus of claim 33 implemented as a computer staffed by an operator communicating via telephone with said customer who is placing an order.

45. The apparatus of claim 33 wherein said solicited payment instruments are of different types.

46. The apparatus of claim 33 further comprising a computer-based accounting system having records updateable to reflect an amount due from the issuer of said selected payment instrument.

* * * * *